United States Patent
Shukla

(10) Patent No.: US 10,035,593 B2
(45) Date of Patent: Jul. 31, 2018

(54) DISTRIBUTED DRONE FLIGHT PATH BUILDER SYSTEM

(71) Applicant: Omniscience Corporation, Sunnyvale, CA (US)

(72) Inventor: Manu Shukla, Sterling, VA (US)

(73) Assignee: Omniscience Corporation, Sunnyvale, CA (US)

(*) Notice: Subject to any disclaimer, the term of this patent is extended or adjusted under 35 U.S.C. 154(b) by 21 days.

(21) Appl. No.: 15/092,004

(22) Filed: Apr. 6, 2016

(65) Prior Publication Data

US 2016/0325832 A1 Nov. 10, 2016

Related U.S. Application Data

(60) Provisional application No. 62/143,526, filed on Apr. 6, 2015.

(51) Int. Cl.
| | |
|---|---|
| *G01C 23/00* | (2006.01) |
| *B64C 39/02* | (2006.01) |
| *G08G 5/00* | (2006.01) |

(52) U.S. Cl.
CPC ........... *B64C 39/024* (2013.01); *G08G 5/006* (2013.01); *G08G 5/0013* (2013.01); *G08G 5/0026* (2013.01); *G08G 5/0034* (2013.01); *G08G 5/0069* (2013.01); *B64C 2201/12* (2013.01); *B64C 2201/141* (2013.01)

(58) Field of Classification Search
CPC ... G01S 17/89; G09G 5/377; B64C 2201/141; B64C 39/024; G08G 5/0034
USPC ..................................... 701/3; 348/144, 148
See application file for complete search history.

(56) References Cited

U.S. PATENT DOCUMENTS

| | | | | |
|---|---|---|---|---|
| 5,467,271 | A | * 11/1995 | Abel | A01B 79/005 702/5 |
| 5,576,964 | A | * 11/1996 | Choate | G01C 21/165 382/106 |
| 2011/0043627 | A1 | * 2/2011 | Werling | G06T 19/006 348/143 |

\* cited by examiner

*Primary Examiner* — Gertrude Arthur Jeanglaude
(74) *Attorney, Agent, or Firm* — Schwegman Lundberg & Woessner, P.A.

(57) ABSTRACT

Drones have become ubiquitous in performing risky and labor intensive areal tasks cheaply and safely. To allow them to be autonomous, their flight plan needs to be pre-built for them. Existing works do not precalculate flight paths but instead focus on navigation through camera based image processing techniques, genetic or geometric algorithms to guide the drone during flight. That makes flight navigation complex and risky. We present automated flight plan builder DIFPL which pre-builds flight plans for drones to survey a large area. The flight plans are built for subregions and fed into drones which allow them to navigate autonomously. DIFPL employs distributed paradigm on Hadoop MapReduce framework. Distribution is achieved by processing sections or subregions in parallel. Experiments performed with network and elevation datasets validate the efficiency of DIFPL in building optimal flight plans.

15 Claims, 2 Drawing Sheets

DISTRIBUTED DRONE FLIGHT PATH BUILDER SYSTEM

PRIORITY

This application claims priority to U.S. Provisional Patent Application Ser. No. 62/143,526, filed Apr. 6, 2015, which application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, Omniscience Inc. All Rights Reserved.

BRIEF SUMMARY OF THE INVENTION

A method to generate a flight plan for an area to be surveyed, the method comprising: identifying a plurality of subregions of an area to be surveyed; constructing a flight plan portion for each of the plurality of subregions; and storing a first subset the flight plan portions in a memory of a first drone so as to enable autonomous navigation by the first drone within the area to be surveyed.

DETAILED DESCRIPTION

Figure 1:
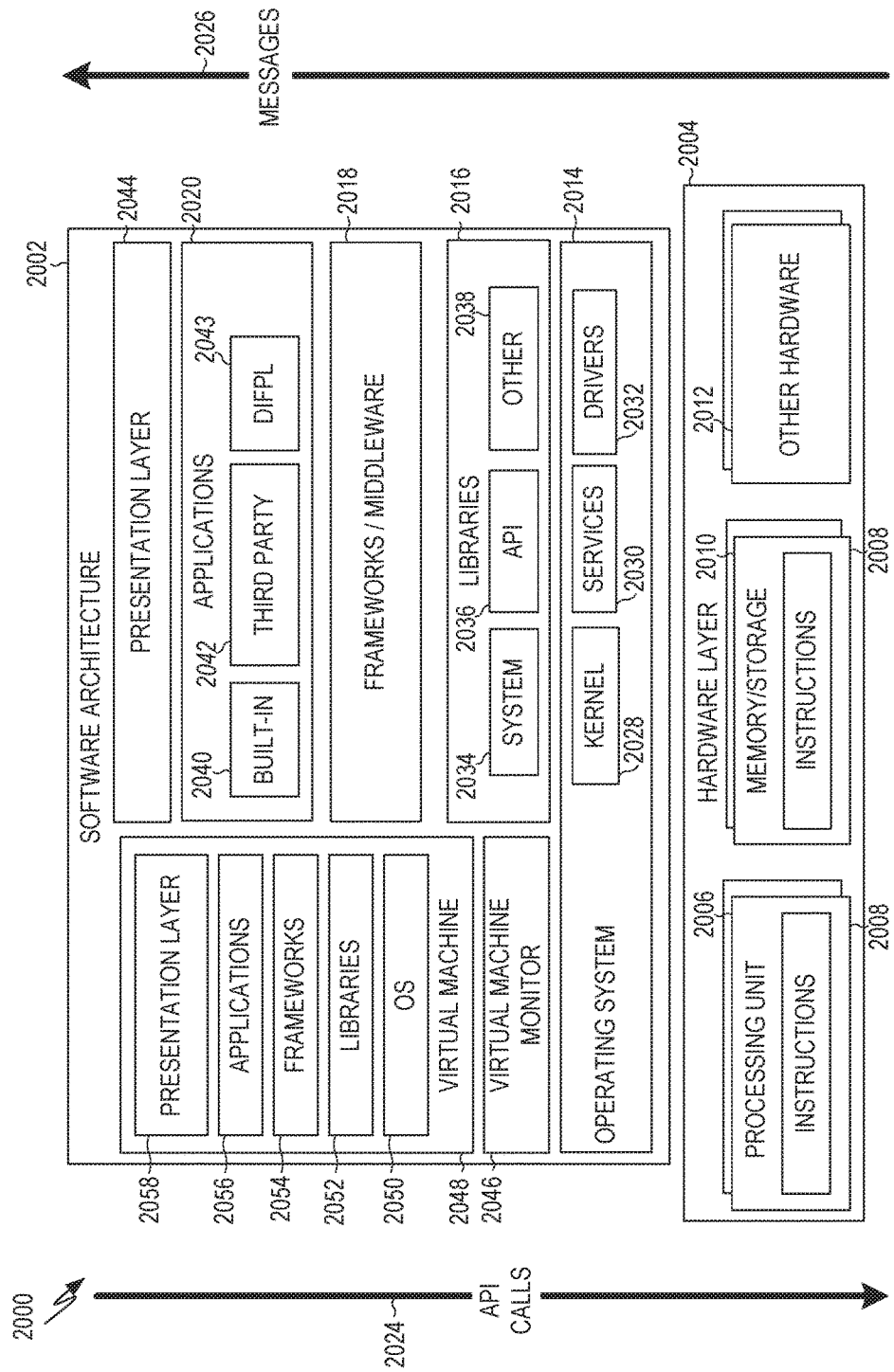
FIG. 1 is a block diagram illustrating a representative software architecture, which may be used in conjunction with various hardware architectures herein described.

The description that follows includes systems, methods, techniques, instruction sequences, and computing machine program products that embody illustrative embodiments of the disclosure.

In some embodiments, a method to generate a flight plan for an area to be surveyed may include identifying a group of subregions of an area to be surveyed, constructing a flight plan portion for each of the group of subregions, and/or storing a first subset the flight plan portions in a memory of a first drone so as to enable autonomous navigation by the first drone within the area to be surveyed.

In some embodiments, the method may include storing a second subset of the flight plan portions in a memory of a second drone, so as to enable autonomous navigation by the second drone within the area to be surveyed.

In some embodiments, the method may include identifying the first drone within which to store the first subset of flight plan portions based on capabilities of the first drone, and identifying the second run within which to store the second subset of the flight plan portions based on capabilities of the second drone.

In some embodiments, the capabilities of the first and second drones are different.

In some embodiments, the constructing of the flight plan portion for each of the group of subregions is distributed within a MapReduce framework.

In some embodiments, the method may include minimizing the number of subregions by merging boundary regions included in the group of subregions after constructing the flight plan portions for the group of subregions.

More specifically, details of an example embodiment referenced as DIFPL are described below. In this description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Modules, Components, and Logic

Certain embodiments are described below as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in herein are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with particular software architecture will create a mobile device, such as a drone, mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

FIG. 1 is a block diagram 2000 illustrating a representative software architecture 2002, which may be used in conjunction with various hardware architectures herein described. FIG. 1 is merely a non-limiting example of a software architecture and it will be appreciated that many other architectures may be implemented to facilitate the functionality described herein. The software architecture 2002 may be executing on hardware such as machine 2100 of FIG. 2 that includes, among other things, processors 2110, memory 2130, and I/O components 2150. A representative hardware layer 2004 is illustrated and can represent, for example, the machine 2100 of FIG. 2, The representative hardware layer 2004 comprises one or more processing units 2006 having associated executable instructions 2008. Executable instructions 2008 represent the executable instructions of the software architecture 2002, including implementation of the methods, modules and so forth that are described herein. Hardware layer 2004 also includes memory and/or storage modules 2010, which also have executable instructions 2008. Hardware layer 2004 may also comprise other hardware as indicated by 2012 which represents any other hardware of the hardware layer 2004, such as the other hardware illustrated as part of machine 2100.

In the example architecture of FIG. 1, the software 2002 may be conceptualized as a stack of layers where each layer provides particular functionality. For example, the software 2002 may include layers such as an operating system 2014, libraries 2016, frameworks/middleware 2018, applications 2020 and presentation layer 2022. Operationally, the applications 2020 and/or other components within the layers may invoke application programming interface (API) calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be used by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a. higher-level common infrastructure that may be used by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be used by the applications 2020 and/or other software components/modules, some of which may be specific to a particular operating system or platform.

The applications 2020 include built-in applications 2040, third party applications 2042 and DIFPL applications 2043 embodying the algorithms described herein (e.g., algorithms 1-5). Examples of representative built-in applications 2040 may include, but are not limited to, a contacts application, a browser application, a book reader application, a location application, a media application, a messaging application, and/or a game application. Third party applications 2042 may include any of the built in applications as well as a broad assortment of other applications. In a specific example, the third party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2042 may invoke the API calls 2024 provided by the mobile operating system such as operating system 2014 to facilitate functionality described herein.

The applications 2020 may use built in operating system functions kernel 2028, services 2030 and/or drivers 2032), libraries (e.g., system 2034, APIs 2036, and other libraries 2038), frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures use virtual machines. In the example of APPENBIX B, this is illustrated by virtual machine 2048. A virtual machine creates a software environment where applications/modules can execute as if they were executing on a hardware machine (such as the machine of FIG. 2, for example). A virtual machine is hosted by a host operating system (operating system 2014 in FIG. 2) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 2:
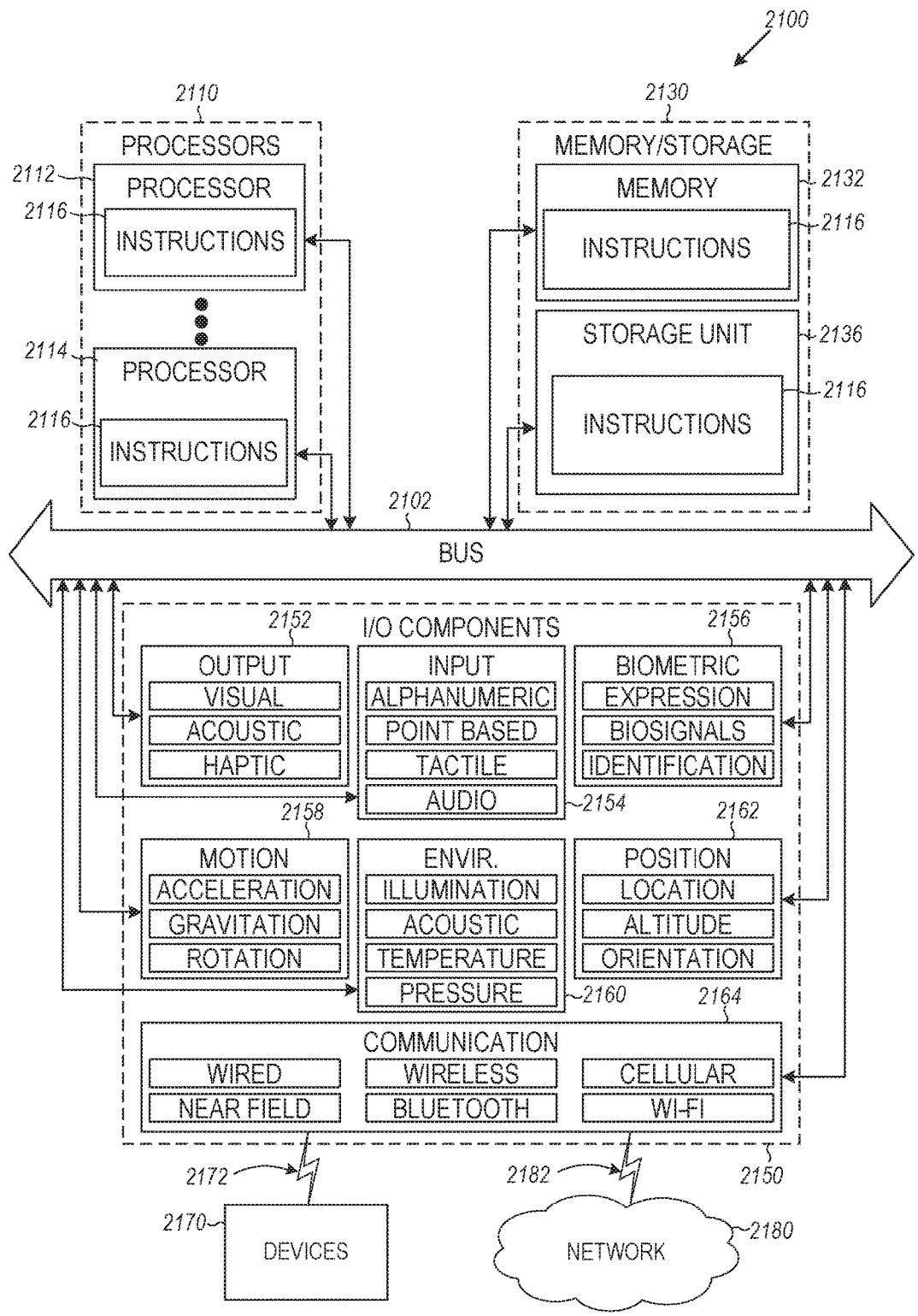
FIG. 2 is a block diagram illustrating components of a machine, according to some example embodiments, able to read instructions from a machine-readable medium.

FIG. 2 is a block diagram illustrating components of a machine 2100, according to some example embodiments, able to read instructions from a machine-readable medium (e.g., a machine-readable storage medium) and perform any one or more of the methodologies discussed herein. Specifically, FIG. 2 shows a diagrammatic representation of the machine 2100 in the example form of a computer system, within which instructions 2116 (e.g., software, a program, an application, an apples, an app, or other executable code) for causing the machine 2100 to perform any one or more of the methodologies discussed herein may be executed. For example the instructions may cause the machine to execute the operations described herein. The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to a drone, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 2 shows multiple processors, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 2. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172 respectively, For example, the communication components 2164 may include a network interface component or other suitable device to interface with the network 2180, In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UTC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals), In addition, a variety of information may be derived via the communication components 2164, such as, location via Internet Protocol (IP) geo-location, location via. Wi-Fi® signal triangulation, location via detecting a NFC beacon signal that may indicate a particular location, and so forth.
Transmission Medium In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed. Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.
DIFPL: Distributed Drone Flight Path Builder System With improvements in technology such as high speed cameras and sensors drones have not only become capable of performing varied tasks but also become increasingly autonomous during flight. Drones have proven very useful in both military battlefield and civilian tasks. Common civilian tasks for drones include education, studying natural phenomena, reconnaissance and conservation amongst others. Drones can fly manually through controller or autonomously. If they are controlled manually the cost of operating them increases. Hence it is preferred to operate them autonomously. Autonomous flying presents challenges in terrain navigation. Multitude of flight path scenarios such as variations in altitude and density of objects to survey need to be handled elegantly. Flight planning has to account for drone hardware limitations.

The complexity of covering an area with automated flights increases when there are multiple types of drones available with different capabilities. For this work drones can be one of two types: Conventional drone which performs conventional take off and landing and Quadcopter with vertical take off and landing. The primary challenge encountered in building flight path of drones is in optimizing the use of different types of drones to cover the entire region. Each drone type has its specific limitations. The cost of operating different types of drones is also varied. The optimization problem then becomes multi-pronged. Not only should it cover the entire region with multiple flights of the right drone type that can navigate varying terrain but also use the cheaper drone as frequently as possible to minimize cost. This motivated us to create DIFPL.

DIFPL accounts for terrain scenarios such as network lines length and elevation based climbing angle to optimally divide area into subregions and build the flight plan for each subregion. It generates a set of Flight Plans in order to cover the entire power lines network of aviation organization and minimize the number of drone flights and overall cost. This is achieved by optimizing coverage by each flight in a subregion and assigning to the type of drone needed for the subregion. Network lines and elevation of waypoints in each subregion need to satisfy rules that are represented as autonomy and climbing angle constraints. The constraints determine if the subregion needs to be shrunk or expanded or split between multiple drone types. Our technique uses sectionwise or subregion based distribution of network lines processing, linear inequalities, and spatial index to query elevation around waypoints. It is powerful as it can automate flight path building with only terrain data and pre-known drone hardware limitations. Focus of this work is on drone flights to take pictures of vegetation over electricity poles network. Image analysis during post-processing determines if the vegetation has overgrown over poles and needs trimming. The application can automate flights for many such tasks such as determine flood damage, deforestation, pollution and agricultural activities. The volume of terrain and network lines data for large areas increases rapidly. In order to scale to the large terrain and networks datasets, DIFPL uses distributed paradigm on Hadoop MapReduce framework. The contributions of the paper are:

Create subregions within overall area dynamically: DIFPL uses a novel way to divide a large area into subregions that can be covered with a single flight of a drone. Processing terrain data by subregion provides flexibility in deciding which type of drone to assign the subregion.

Model terrain scenarios with multiple drone types and their hardware limits: This work combines terrain and network data with drone flight constraints for multiple drone types applied as linear inequalities. It maximally exploits capability of each drone type to determine subregion size and type of drone to cover it.

Distribute flight plan creation: Flight plan construction is distributed with MapReduce framework. Distribution eliminates any limitations on size of spatial index on a single node with novel key-value pair based joins and scales horizontally to larger terrains datasets.

Optimize subregions after distributed processing: DIFPL minimizes subregions by merging as many boundary regions as possible after creating flight plans for subregions. This requires aligning incomplete subregions so adjacent ones can be merged optimizing subregions and its effectiveness is validated by experiments.

Section 2 explores research related to this work. Section 3 presents the preliminary design considerations of flight plan builder. In Section 4 the MapReduce framework based DIFPL implementation is described followed by experiments in Section 5. Conclusions are presented in Section 6.

2 Related Work

Research similar to this work can be broken into two categories, previous approaches to automate flight of drones and distributed platforms for general spatial data processing and specific to drones.

Automated flights: Several ways to automate the flight of drones exist including using sensors, camera images, feeding their waypoints as a file or automating from the control. Genetic algorithms have been used to trace flight paths along with ant colony algorithms in 3D route planning. Optimization algorithms for multi-objective drone route planning have been explored.

Distributed spatial operations: With increase in spatial data distributed approaches are increasingly being explored. Spatial data processing using MapReduce is explored. Techniques for accelerated processing with MapReduce have been proposed. Distributed spatial operations on Hadoop and SpatialHadoop as Hadoop extension for spatial operations have been explored. Computational geometry algorithms have been distributed using SpatialHadoop. Distribution of drone data analysis and multiple drone flight coordination tasks has begun to gather momentum. Hadoop based platforms that support spatial queries with MapReduce are proposed.

As far as we know, previous works did not consider multiple drone types and variations in terrain together in automating flight paths. DIFPL does not rely on images or video to navigate. Flight paths are built offline with terrain and network lines data and do not need to be adjusted dynamically as all the constraints are applied at the time of running the program. Our distributed technique makes 2 passes on the data using standard hadoop constructs and avoids building a large index on a single node by splitting the data into sections or subregions that can be processed independently.

3 Preliminaries

In this section we describe the background information to DIFPL including input and output data, constraints on the hardware and subregion and waypoint construction.

3.1 Data

DIFPL uses inputs (x,y) geocoordinate position of network lines endpoints provided by aviation organization and elevation data (x,y,elevation) provided by geographic agency. The elevation points are 25 m apart. Output of the program is a set of flight plans, each composed of a set of waypoints (x,y,altitude) and one landing point in KML format to be fed directly into the drone. A separate output file is written for each subregion. The elevation points data is filtered for the region for which network lines data is available as part of pre-processing. Every network line had to be covered by one of the available drone types.

3.2 Constraints

The drone characteristics are specific to the type of drone, such as speed, autonomy, turning radius, max slope, and flight height. These characteristics were kept configurable and drone company was given ability to adjust them easily through configuration files. Every pole in network lines need to be photographed at least 4 times. The drone does 2 passes from each side of the lines, one pass in one direction and another pass in the other direction. Drone is equipped with a NEX7 24 Mega pixel camera with 50 mm optical lens. The images are used to perform 3D image reconstruction of each pole to determine if vegetation has overgrown around the pole. Every attempt is made to maximize the use of conventional drones as they are cheaper and more plentiful. Primary limitations of the hardware of drones are:

Number of waypoints: The hardware of conventional drone can be programmed with up to 200 waypoints and the quadcopter can be programmed with 50 waypoints.

Climbing angle: Max slope of ascent for conventional drone is 12° while for descent is −16°. For quadcopter the max slope for ascent is 90° and for descent is −90°.

Autonomy: Maximum distance a conventional drone can fly in single flight is 30 KM and a quadcopter can fly is 3 KM.

The constraints on the flight path of drones are modeled as inequalities. The inequalities are applied for each subregion for the type of drones. The inequalities are defined as follows.

For climbing angle:

$$\text{Max}(c_p) \leq C_{type}$$

where $c_p$ is measure of the angle drone has to climb to fly from one waypoint to next along network line and is calculated from recommended drone flying altitude and elevation at the waypoints. The recommended altitude for conventional drone is 100 m and for quadcopter is 50 m. The maximum weight of the drone can be 2200 g. For the waypoints along the sides of the network lines, the elevation is calculated by querying the k nearest neighbor elevation points with a kNN spatial index query and taking their average and ensuring it satisfies the climbing angle constraint.

For autonomy:

$$\sum_l (2 * d_l + i_l) + 3 * l * 2 * \pi * r + t + n \leq A_{type}$$

where d is the distance of each network line, t is the takeoff distance to get to required elevation over first network pole with the climbing angle of each drone type, n is the landing distance with the descent angle for drone type, i distance between two network lines and r is the turn distance for the drone type for l lines. Turning radius of conventional drone is 150 m while that of quadcopter is 0 m. The distance i is calculated by ordering network lines in the subregion by their $X_{start}$ and calculating the distance between one line to next. Since there are 3 turns for a drone to cover a line segment twice and proceed to the next line segment 3 turning circumferences have to be added to the equation. The requirement of photographing each pole 4 times is satisfied by setting camera to take an image a second. The number of waypoints in output is achieved by collecting waypoints along network lines every 200 m for conventional drone and every 100 m for quadcopter and increasing it if the number of waypoints exceed the maximum.

4 Distributed System DIFPL

This section describes the distributed system DIFPL that builds flight plans based on distributed paradigm. It gives overview of the architecture of the system, algorithms used and optimized distribution for maximum parallelization.

4.1 Architecture Distributed System Architecture

The architecture of DIFPL is based on distributed paradigm. The distribution approach in DIFPL was implemented using Apache Hadoop MapReduce framework.

Hadoop: Hadoop is an open source framework which facilitates distributed computations on large clusters. A master node orchestrates data storage and computation distribution over multiple slave nodes. Files are uploaded into distributed file storage called HDFS, split into 64 MB blocks and then processed. Master node keeps track of all the blocks of a file and where they are stored. MapReduce allows master node to break down computation tasks into mappers and reducers distributed over slave nodes. They work on file blocks on slave nodes exploiting colocation of computation with data. Mappers read in input data as key value pairs $<k_1, v_1>$ and emit intermediate key value pairs $<k_2, v_2>$. Reducer receive the intermediate key value pairs grouped by $k_2$ and processes them to generate the final set of key value pairs $<k_3, v_3>$.

The distribution of flight path builder is necessitated due to memory limitations of indexing large elevation and network datasets on a single node. Several opportunities for distribution of the flight plan builder process are available. The identification of quadcopter subregions and the shrinking of quadcopter and conventional drone subregions can be performed in parallel. The distributed application runs on a cluster on Amazon Web Services (AWS). MapReduce jobs are run on AWS Elastic MapReduce (EMR) and data is read from and written to S3 buckets similar to HDFS. It uses Hadoop 2.5.1 and MapReduce2. The experiments were performed on a 5 node Hadoop cluster with I master and 4 slave nodes.

4.2 Algorithms

The algorithms used in DIFPL include a base Build Flight Plans algorithm that performs queries and applies constraints on results within a section or subregion. Two levels of distribution are built, one based on the flight path algorithm and another parallelized on subregions.

4.2.1 Flight Path Building within Section

Algorithm 1 shows the process of building the flight paths. The flight plan building is implemented in 3 steps. The builder reads index file from disk if present else reads the network line and elevation data {network$_i$} and {elevation$_i$} and inserts them into a spatial index Si. The builder then starts querying index with conventional drone default $D_c$ sized subregions as range queries $q_i$. Objects returned in result set of the query $r_i$ include network lines and elevation points inside the subregion. It calculates waypoints along network lines in query and then elevation of waypoints using kNN query and averaging the elevation of nearest neighbors. If the network lines l; satisfy the conventional drone autonomy constraint $A_c$ but fail to satisfy the conventional drone climbing angle constraint $C_c$, then it queries spatial index for the subregion using default size of quadcopter $D_q$ with queries $qq_i$ from left to right. Each consecutive quadcopter size subregion that satisfies the climbing angle constraint is merged with previous one. Ones that do not satisfy $C_c$ are deemed to require quadcopter. If the length of network lines in $r_i$ are too large or less than β% threshold of the autonomy of quadcopter or conventional drone, then the subregion is shrunk or expanded iteratively till it satisfies the autonomy constraint for the respective drone type. The output for each subregion $O_i$ as waypoints and landing point is written out.

4.2.2 Sectionwise Distribution

The first task of distribution is to split the entire area into sections and query for subregions in spatial index built separately for each section. This allows for building smaller sections in spatial index instead of the entire area.

The distribution paradigm is broken down into 2 phases, each translating into a pass over the data. Each pass incrementally identifies subregions for quadcopter or conventional drone and final pass resolves boundary issues and outputs final flight paths for each subregion.

Algorithm 1 Build Fligh Plans

Input: {$network_i$},{$elevation_i$} {network lines and elevation data}
Output: {$subregion_j$,$waypoint_j$} {each subregion and waypoints}
  1: {step 0: setup index and subregion iterations}
  2: if index spatial index file does not exist then
  3: $Si \leftarrow$ {$network_i$,$elevation_j$} {create spatial index with network lines as 2D objects and elevation points}
  4: else
  5: read Si from disk {read in spatial index from disk}
  6: end if
  7: $\forall$query $q_i$ for subregions $subregion_i$ starting from bottom left of region with size $D_c$
  8: while !at top right of region do
  9: regionDone=false
  10: $r_i \leftarrow Si(q_i)$ {query Spatial index Si with query $q_i$ to generate result set}
  11: generate $waypoint_i$ in $r_i$
  12: for all $waypoint_i$ in $r_i$ do
  13: $elevation_{wi} \leftarrow$ $$\frac{\Sigma kNN_{waypoint}}{k}$$

14: end for
  15: if max $C(r_i) \leq C_c$ then
  16: {step 1: Subregion can be covered with conventional drone}
  17: {retrieved objects elevations satisfy conventional drone climbing angle constraint}
  18: while $\Sigma\{ll,l\}$ does not satisfy $A_c$ do
  19: {retrieved objects network lines do not satisfy conventional drone autonomy constraints}
  20: $Si \leftarrow q_i \pm \gamma$
  21: {reduce or expand window size and re-query}
  22: end while
  23: if $\Sigma\{ll,l\}$ satisfies $A_c$ then
  24: {conventional drone constraints satisfied}
  25: {$waypoint_i$}$C_q$ {create waypoints for conventional drone subregion}
  26: write output $O_i$
  27: $q_i \rightarrow q_i$ {move to next window}
  28: end if
  29: else
  30: {step 2: Subregion needs quadcopter}
  31: for all $qq_i \epsilon q_i$ do
  32: $r_i \leftarrow Si(qq_i)$
  33: {requery with default quadcopter subregion sizes}
  34: if !maxC($r_i$)$\leq C_c$ then
  35: {region fails conventional drone climbing angle constraints}
  36: {$waypoint_j$}$\leftarrow Q_q$
  37: {build waypoints for quadcopter}
  38: $qq_i \rightarrow qq_j$
  39: {move to next window}
  40: else
  41: $O_i \cup q_{i-1}$ {merge into previous conventional subregion}
  42: Write Output $O_i$
  43: end if
  44: end for
  45: end if
  46: end while Assign and process section: The first pass labels network and elevation data with the section they belong to. The details are described in Algorithm 2. The data is processed by two mappers. First mapper reads network lines data {$network_i$} as text and calculates section id based on the coordinates of the network line. The key value pair emitted from the mapper are <$sectionID_j$,$networkline_j$>. The second mapper similarly reads elevation data {$elevation_j$} and calculates section id and emits <K,V>pairs <$sectionID_j$,$networkline_i$>, The reducer reads the data and aggregates all elevation and network line observations for a section id.

Algorithm 2 Assign and Process Section

Input: {$elevation_i$,$networkline_i$}
Output: $subregion_j \rightarrow$ {$xsr_j$, $ysr_j$, $xer_j$, $yer_j$, quadcopter|conventional, {$network_j$},{$elevation_j$},{$waypoint_j$}
  1: mapper1:
  2: calculate $sectionID_j$ based on its coordinates
  3: emit:$sectionID_j \rightarrow elevation_j$
  4: mapper2:
  5: calculate $sectionID_j$ based on its coordinates
  6: emit:$sectionID_j \rightarrow networkline_j$
  7: reducer:
  8: for all observations do
  9: build $section_j$
  10: end for
  11: APPLY Build Flight Plans Algorithm
  12: emit:$subregion_j \rightarrow$ {$xsr_j$, $ysr_j$, $xer_j$, $yer_j$, quadcopter|conventional, {$network_j$},{$elevation_j$},{$waypoint_j$}

Reducer builds spatial index for elevation points for the subregion with network and elevation data in memory and marks quadcopter and conventional subregion by elevation and length constraints. It shrinks, expands and merges subregions as needed. The final emitted <K,V>pairs in the reducer are the details of each subregion within a section such as subregion id $subregion_j$, the subregion extent $xsr_j$, $ysr_j$, $xer_j$, $yer_j$, a flag indicating if its a quadcopter or conventional drone subregion, the network lines and elevation points and waypoints for a quadcopter or conventional drone to follow along the network lines in the subregion $waypoint_k$, . . . , $waypoint_l$.

Resolve edge effects: Second pass resolves edge effects between sections as described in Algorithm 3. The input to the mapper are the subregions $subregion_j$ with their extent, the drone type needed, network lines and elevation points in the subregion and the waypoints. For the subregions that are along the vertical edge of the sections associated with their section id, reducer pairs the corresponding left and right subregions. The subregions could be merged together if they are covered by same drone type. The output from the reducer are the entire set of subregions that include merged subregions. All non boundary subregions are emitted as is.

Algorithm 3 Resolve Edge Effects

Input: {$subregion_j \rightarrow$ {$xsr_j$, $ysr_j$, $xer_j$, $yer_j$, quadcopter|conventional, {$waypoint_j$},{$network_j$},{$elevation_j$}
Output: $subregion_j \rightarrow$ {$xsr_j$, $ysr_j$, $xer_j$, $yer_j$, quadcopter |conventional, {$waypoint_k$}}
  1: mapper:
  2: emit: "verticalborder|notverticalborder"$\rightarrow subregion_j$, {$xsr_j$, $ysr_j$, $xer_j$, $yer_j$, {$network_j$}, {$elevation_j$}{$waypoint_k$},}

3: reducer:
4: if border then
5: if subregion$_i$ && subregion$_j$ are adjacent then
6: if they can be merged with combined subregion network length <β% then
7: merge subregions
8: emit:subregion$_k$→{xsr$_k$, ysr$_k$, xer$_k$, yer$_k$, quadcopter|conventional, {waypoint$_k$}}
9: else
10: emit:subregion$_i$→{xsr$_i$, ysr$_i$, xer$_i$, yer$_i$, quadcopter|conventional, {waypoint$_i$}}
11: emit:subregion$_j$→{xsr$_j$, ysr$_j$, xer$_j$, yer$_j$, quadcopter|conventional, {waypoint$_j$}}
12: end if
13: end if
14: else
15: emit:subregion$_j$→{xsr$_j$, ysr$_j$, xer$_j$, yer$_j$, quadcopter|conventional, {waypoint$_j$}}
16: end if

4.3 Optimized Distribution

A more scalable approach which precludes need to build spatial indexes in each reducer in order to build waypoints in a subregion is now discussed with network lines passed in raw form and elevations inserted in spatial index.

Assign and process subregion: This algorithm receives as input network and elevation data as {elevation$_i$},{networkline$_i$} and in mapper emits them with the key subregion$_j$. Mapper emitted pairs subregion$_j$,networkline$_j$ and subregion$_j$, elevation$_j$ then result in network lines and elevation points landing together in the reducer. in reducer the waypoints are built along the network lines and climbing angle constraint $C_c$ checked by querying elevation points from subregion near waypoint from spatial index using kNN query. then emits all subregions with waypoints and a flag indicating if they are complete or incomplete. The details are shown in Algorithm 4. If the autonomy constraint is not satisfied such that the network lines are too long or less than threshold β% of the drone type autonomy, then we mark the subregion at the time of emission from reducer as incomplete. The task then becomes to merge the adjacent incomplete subregions.

Algorithm 4 Assign and Process Subregions
Input: {elevation$_i$,networkline$_j$}
Output: subregion$_j$→xsr$_j$, ysr$_j$, xer$_j$, yer$_j$, {waypoint$_j$}, quadcopter|conventional, complete |incomplete, {elevation$_j$}, {networkline$_j$}
1: mapper1:
2: emit:subregion$_j$→elevation$_j$
3: mapper2:
4: emit:subregion$_j$→networkline$_j$
5: reducer:
6: index {elevation$_i$} in spatial index
7: for all observations calculate waypoints$_j$ based on its network lines do
8: for all waypoint$_i$ calculate elevation with kNN query do
9: compute climbing angles and check if they satisfy constraint $C_c$
10: if climbing angle fails constraint then
11: split subregion into quadcopter subregions
12: progressively apply $C_c$ on each subregion of size $D_q$
13: if satisfied then
14: if autonomy constraint $A_c$ satisfied then
15: merge with previous if autonomy constraint satisfied
16: else
17: mark as quadcopter
18: end if
19: end if
20: emit:subregion$_j$→xsr$_j$, ysr$_j$, xer$_j$, yer$_j$, {waypoint$_j$}, quadcopter |conventional, complete |incomplete, {elevation$_j$},{networkline$_j$}
21: else if autonomy constraint $A_c$ not satisfied then
22: shrink subregion$_j$
23: emit:subregion$_j$→xsr$_j$, ysr$_j$, xer$_j$, yer$_j$, {waypoint$_j$}, quadcopter |conventional, complete |incomplete, {elevation$_j$},{networkline$_j$}
24: end if
25: end for
26: end for Reconcile adjacent subregions: Subregions in sparse area that need to be expanded, or ones generated after shrinking dense subregion are emitted as incomplete. All subregions that are split result in a set of quadcopter and conventional drone subregions. The ones that are not able to satisfy the autonomy β% constraint are also emitted by reducer as incomplete to merge with adjacent incomplete subregions. The details are shown in Algorithm 5. The algorithm accepts all subregions and mapper emits ones that are incomplete. The reducer then aligns the ones that are adjacent. It then checks if the adjacent subregions can be merged together. Every time a merged subregion satisfies β% threshold and autonomy constraint it emits it in reducer as subregion$_i$→{xsr$_i$, ysr$_i$, xer$_i$, yer$_i$, {way point$_i$}, quadcopter|conventional} and proceeds to the next.

Algorithm 5 Reconcile Adjacent Subregions
Input: subregion$_j$→xsr$_j$, ysr$_j$, xer$_j$, yer$_j$, {waypoint$_j$}, quadcopter|conventional, complete |incomplete,{elevation$_j$}, {networkline$_j$}
Output: subregion$_i$,xer$_i$, yer$_i$, xsr$_i$, xsr$_i$,{waypoint$_i$}, conventional|quadcopter
1: mapper:
2: emit:"incomplete"→subregion$_i$, xer$_i$, yer$_i$, xsr$_i$, ysr$_i$, {elevation$_i$},{networkline$_i$},incomplete,{waypoint$_i$}, conventional|quadcopter
3: emit:subregion$_j$→xer$_i$, yer$_i$, xsr$_i$, xsr$_i$, {elevation$_i$},{networkline$_i$},complete,{waypoint$_i$}, conventional|quadcopter
4: reducer:
5: for all incomplete subregions calculate new subregions based on its coordinates do
6: if subregion$_i$ && subregion$_j$ are adjacent then
7: if they can be merged with combined subregion network length <β% then
8: merge subregions
9: emit:subregion$_k$→{xsr$_k$, ysr$_k$, xer$_k$, yer$_k$, quadcopter|conventional,{waypoint$_k$}}
10: else
11: emit:subregion$_i$→{xsr$_i$, ysr$_i$, xer$_i$, yer$_i$, quadcopter|conventional,{waypoint$_i$}}
12: emit:subregion$_j$→{xsr$_j$, ysr$_j$, xer$_j$, yer$_j$, quadcopter|conventional,{waypoint$_j$}}
13: end if
14: end if
15: for all complete subregions do
16: emit:subregion$_i$→{xsr$_i$, ysr$_i$, xer$_i$, yer$_i$, quadcopter|conventional,{waypoint$_k$}}
17: end for
18: end for

5 Experiments

This section explores the scenarios to determine a subregion and the type of drone flights to cover it. The scenarios can be divided into 3 categories. They can be within a section including the entire area on a single node or distributed by subregion.

5.1 Scenarios within a Single Section

These scenarios occur when applying queries and constraints within a single section which can either be the whole area or a section.

Use of Conventional Drone: The waypoints for the subregion are highlighted along with the electric pole network lines they have to cover which are shown in red. The distance δ of waypoints path from the network line is constant and configurable. The turning radius of drone along with flight from one network line to another is taken into account in the autonomy constraint but not entered as waypoint as drone automatically determines how it will navigate from one point to next. The circles represent the turns conventional drone has to make to fly on both sides of a network line.

Expanding subregion for conventional drone or quadcopter: Some implementations relate to the subregion which has network lines less than β% autonomy of a conventional drone. The size of the subregion is incrementally expanded by length γ until autonomy reaches β% of constraint or higher. This parameter is kept configurable and defaults to 80%.

Splitting subregion between conventional drone and quadcopter flights: If a subregion fails to satisfy the climbing angle constraint for a conventional drone it is split to cover segments where constraint fails with a quadcopter. Some aspects relate to the flight path waypoints for a subregion that can not be covered by a conventional drone and requiring a quadcopter. A larger subregion with this split may be used. Quadcopter default size subregions are incrementally applied to determine where the conventional drone climbing angle constraint fails. If that subregion lies in the middle of the original subregion, it is covered with quadcopter and all the other subregions before it are assigned to minimal number of conventional drone flights. Subregions after the last quadcopter segment are merged with the subsequent conventional drone subregion indicated by dotted line. Only one subregion which required quadcopter coverage was found so after that subregion algorithm resumes querying with default conventional drone subregion size. The quadcopter default sized subregions before the quadcopter assigned subregion are merged together into one conventional drone subregion.

Shrinking subregion for conventional drone or quadcopter: Subregions which has network lines too long for a conventional drone or quadcopter to cover in one flight necessitates shrinking of subregion. Some aspects relate to incrementally shrinking of subregion by horizontal length γ until a size that satisfies the distance constraint for conventional drone is reached. The shrinking reduces the length of network lines until it can be covered by a conventional drone. The querying then resumes from the end of shrunk subregion. The dotted lines represent incrementally shrunk subregions.

After experimenting with several default subregion sizes for both types of drones starting default subregion sizes of 3.7 KM×2.9 KM for conventional drone and 3.7 KM×0.29 KM for quadcopter serve as good default sizes. The defaults are optimal size to utilize the autonomy of the conventional drones and quadcopter and minimize processing time. Some aspects relate to the subregions in the overall area with some subregions covered by conventional drone and some by quadcopter and some subregions being shrunk for conventional drone and some split for quadcopter and the remaining segment covered in the following subregion. The subregions match well the network lines and their density. Dense network lines areas have more default size and shrunk conventional drone subregions. Larger number of quadcopter subregions indicate altitude variations. Sparse network line areas has larger number of expanded conventional drone subregions.

The optimizations allow for far fewer drone subregions overall and minimized number of quadcopter flights which is the goal as conventional drone are cheaper and more plentiful. The incremental optimizations impact is disclosed. The incremental savings with expansions and splitting of conventional default sized subregions into minimal number of quadcopter and conventional drone subregions is very effective in minimizing subregions, in particular quadcopter subregions. The bulk of efficiency comes from expanding subregions reducing the number of conventional drone subregions from 1553 to 809. The splitting of a conventional drone subregion into pinpoint quadcopter and efficiently merged conventional drone subregions minimizes the number of quadcopter subregions.

5.2 Distributed Scenarios

In distributed paradigm, the scenarios change as subregions on the edges of sections can not expand which as then resolved in an additional step.

Shrink, expand, merge or split subregions: The subregions are shrunk and expanded based on the same threshold β% of autonomy as used in sequential algorithm for each section. This invariably means several subregions on the right edge of each section do not get to meet the threshold as they run out of room to expand. This issue is mitigated to some extent by the edge effect job.

Merge section edge subregions: Edge subregions for each section are merged together if feasible. If the subregions are being covered by the same drone type on either side of an edge and they have not been expanded they are likely to be merged together. Experiments find 4 such subregions.

5.3 Optimized Distributed Scenarios

Optimized distribution focuses on processing each subregion in parallel. The subregions are then reconciled by merging with adjacent subregions.

Splitting or shrinking subregion: Since a subregion by itself can not be expanded, it can only be shrunk if its network lines length exceeds the autonomy of a conventional drone or quadcopter. We mark the subregions that do not satisfy the β% network line length constraint after splitting or shrinking as incomplete. Subregions that satisfy the length constraint are emitted as complete.

Merging subregions: All incomplete subregions are then ordered and adjacent ones that can be merged together are emitted as new subregions. Some aspects relate to the subregions created by the subregion parallelization. The entire set of subregions that can be processed together are merged if possible in a single pass. Running the scenarios in the distributed paradigm produces results that are similar to the sequential processing results in terms of number of subregions of quadcopter or conventional drone type. Merging reduces quadcopter subregions by 627 and conventional subregions by 385.

Comparisons of single node run with distributed and optimized distributed results are disclosed. It clearly shows the impact of merge on reducing the count of quadcopter and conventional drone subregions in optimized distribution. After merge there are 1239 conventional drone subregions and 1839 quadcopter subregions which compares well with 809 conventional drone subregions and 2181 quadcopter subregions in single node execution.

6 Conclusions

DIFPL uses a novel approach to flexibly divide a large area into subregions and dynamically adjust them to optimally cover with a single drone flight, It combines spatial data and drone limitations or constraints modeled as linear inequalities to automate flight path of drones. The distributed implementation presents way to handle large datasets which can not be processed on a single node. The subregion level distribution allows horizontal scalability. The flight plans produced by distributed version are similar in numbers to the ones by single node implementation but generated more efficiently. The technique used is not only useful for the task of surveying power lines but extensible to a host of other drone applications.

The invention claimed is:

1. A method to generate a flight plan for an area to be surveyed, the method comprising:
    identifying a plurality of subregions of an area to be surveyed;
    constructing, based on network line and elevation data associated with the plurality of subregions, a flight plan portion for each of the plurality of subregions; and
    storing a first subset of the flight plan portions in a memory of a first drone so as to enable autonomous navigation by the first drone within the area to be surveyed.

2. The method of claim 1, including storing a second subset of the flight plan portions in a memory of a second drone, so as to enable autonomous navigation by the second drone within the area to be surveyed.

3. The method of claim 2, including identifying the first drone within which to store the first subset of flight plan portions based on capabilities of the first drone, and identifying the second run within which to store the second subset of the flight plan portions based on capabilities of the second drone, wherein the capabilities of the first and second drones are different.

4. The method of claim 1, wherein the constructing of the flight plan portion for each of the plurality of subregions is distributed within a MapReduce framework.

5. The method of claim 1, including minimizing the number of subregions by merging boundary regions included in the plurality of subregions after constructing the flight plan portions for the plurality of subregions.

6. A system comprising:
    at least one processor; and
    at least one memory storing instructions that, when executed by the at least one processor, cause the at least one processor to:
        identify a plurality of subregions of an area to be surveyed;
        construct, based on network line and elevation data associated with the plurality of subregions, a flight plan portion for each of the plurality of subregions; and
        store a first subset of the flight plan portions in a memory of a first drone so as to enable autonomous navigation by the first drone within the area to be surveyed.

7. The system of claim 6, including storing a second subset of the flight plan portions in a memory of a second drone, so as to enable autonomous navigation by the second drone within the area to be surveyed.

8. The system of claim 7, including identifying the first drone within which to store the first subset of flight plan portions based on capabilities of the first drone, and identifying the second run within which to store the second subset of the flight plan portions based on capabilities of the second drone, wherein the capabilities of the first and second drones are different.

9. The system of claim 6, wherein the constructing of the flight plan portion for each of the plurality of subregions is distributed within a MapReduce framework.

10. The system of claim 6, including minimizing the number of subregions by merging boundary regions included in the plurality of subregions after constructing the flight plan portions for the plurality of subregions.

11. A non-transitory computer-readable storage medium, the computer-readable storage medium storing instructions that, when executed by a computer, cause the computer to:
    identify a plurality of subregions of an area to be surveyed;
    construct, based on network line and elevation data associated with the plurality of subregions, a flight plan portion for each of the plurality of subregions; and
    store a first subset of the flight plan portions in a memory of a first drone so as to enable autonomous navigation by the first drone within the area to be surveyed.

12. The computer-readable storage medium of claim 11, including storing a second subset of the flight plan portions in a memory of a second drone, so as to enable autonomous navigation by the second drone within the area to be surveyed.

13. The computer-readable storage medium of claim 12, including identifying the first drone within which to store the first subset of flight plan portions based on capabilities of the first drone, and identifying the second run within which to store the second subset of the flight plan portions based on capabilities of the second drone, wherein the capabilities of the first and second drones are different.

14. The computer-readable storage medium of claim 11, wherein the constructing of the flight plan portion for each of the plurality of subregions is distributed within a MapReduce framework.

15. The computer-readable storage medium of claim 11, including minimizing the number of subregions by merging boundary regions included in the plurality of subregions after constructing the flight plan portions for the plurality of subregions.

* * * * *